Nov. 7, 1939.  G. SIFKOVITZ  2,179,165
VALVE
Filed Sept. 13, 1935  4 Sheets-Sheet 1
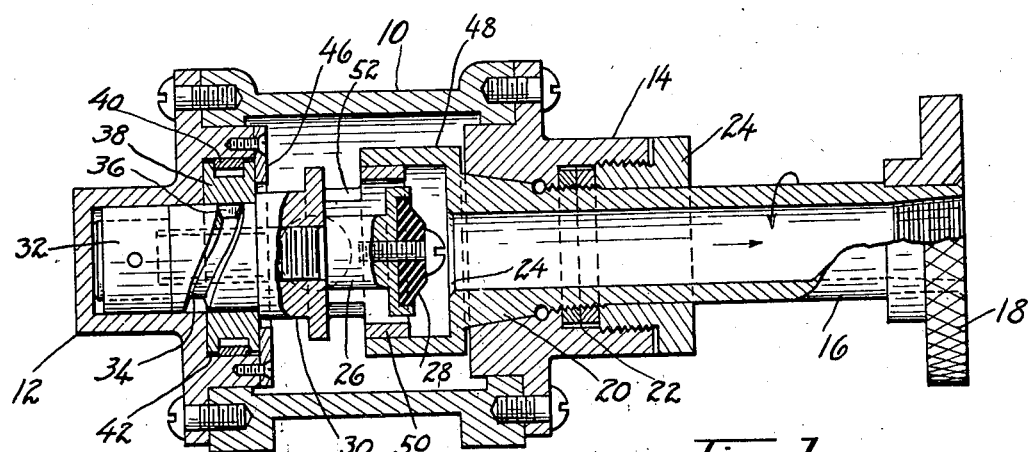
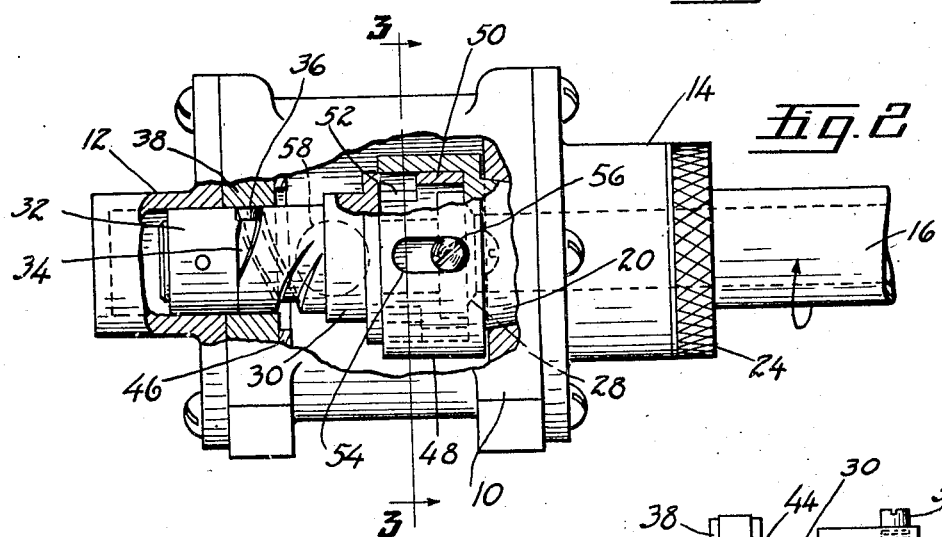
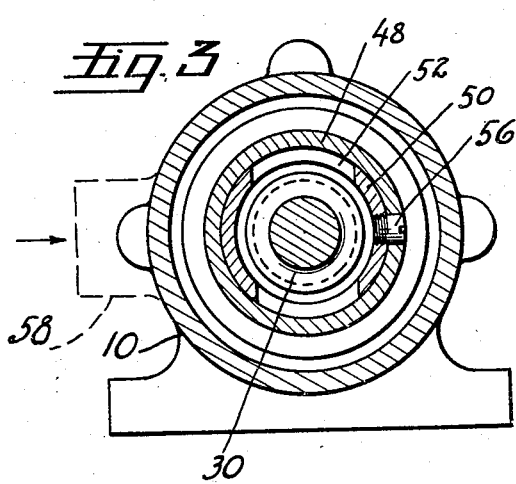
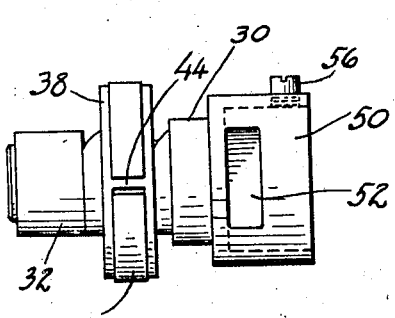
INVENTOR.
George Sifkovitz
BY
Parker & Burton
ATTORNEYS.

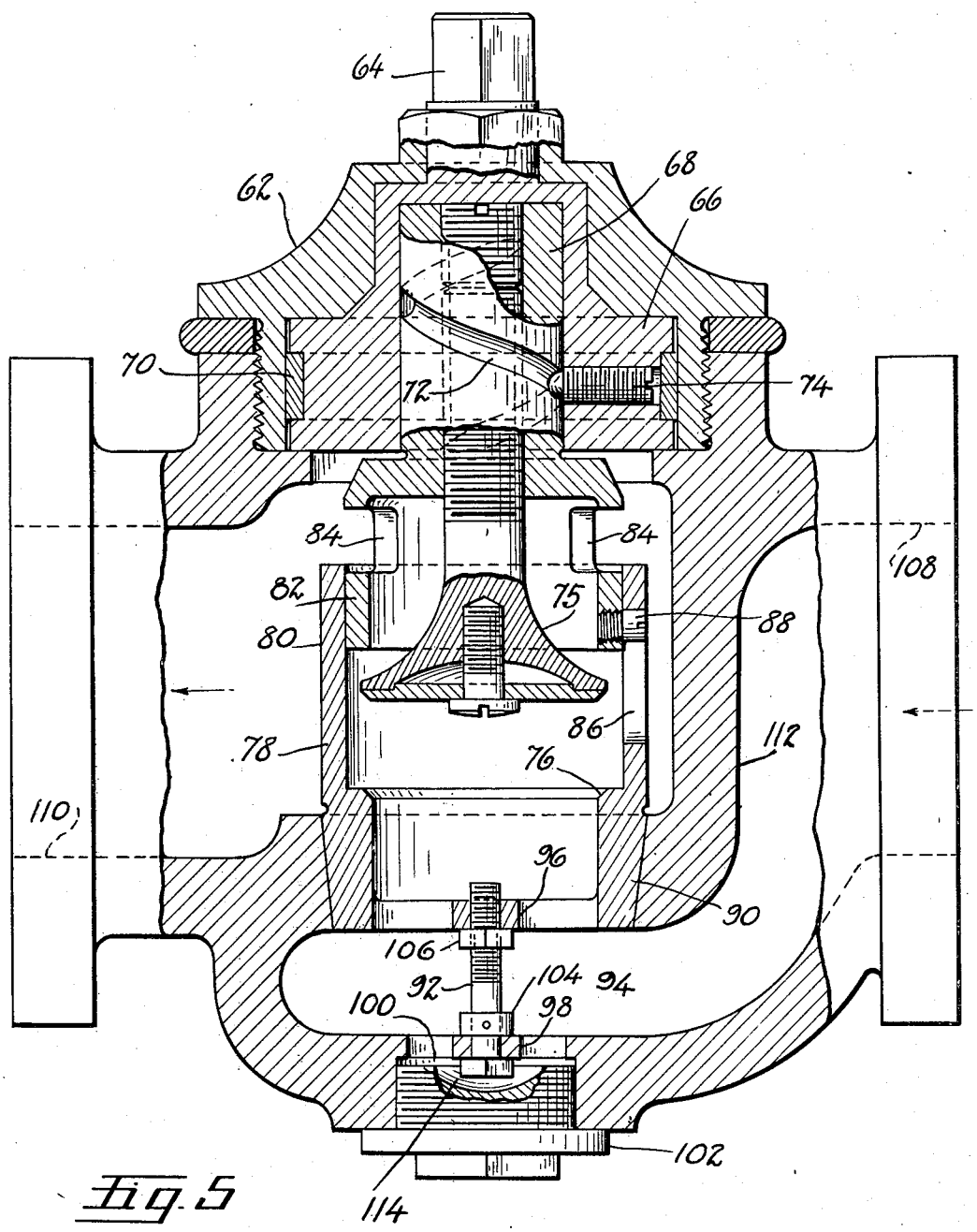

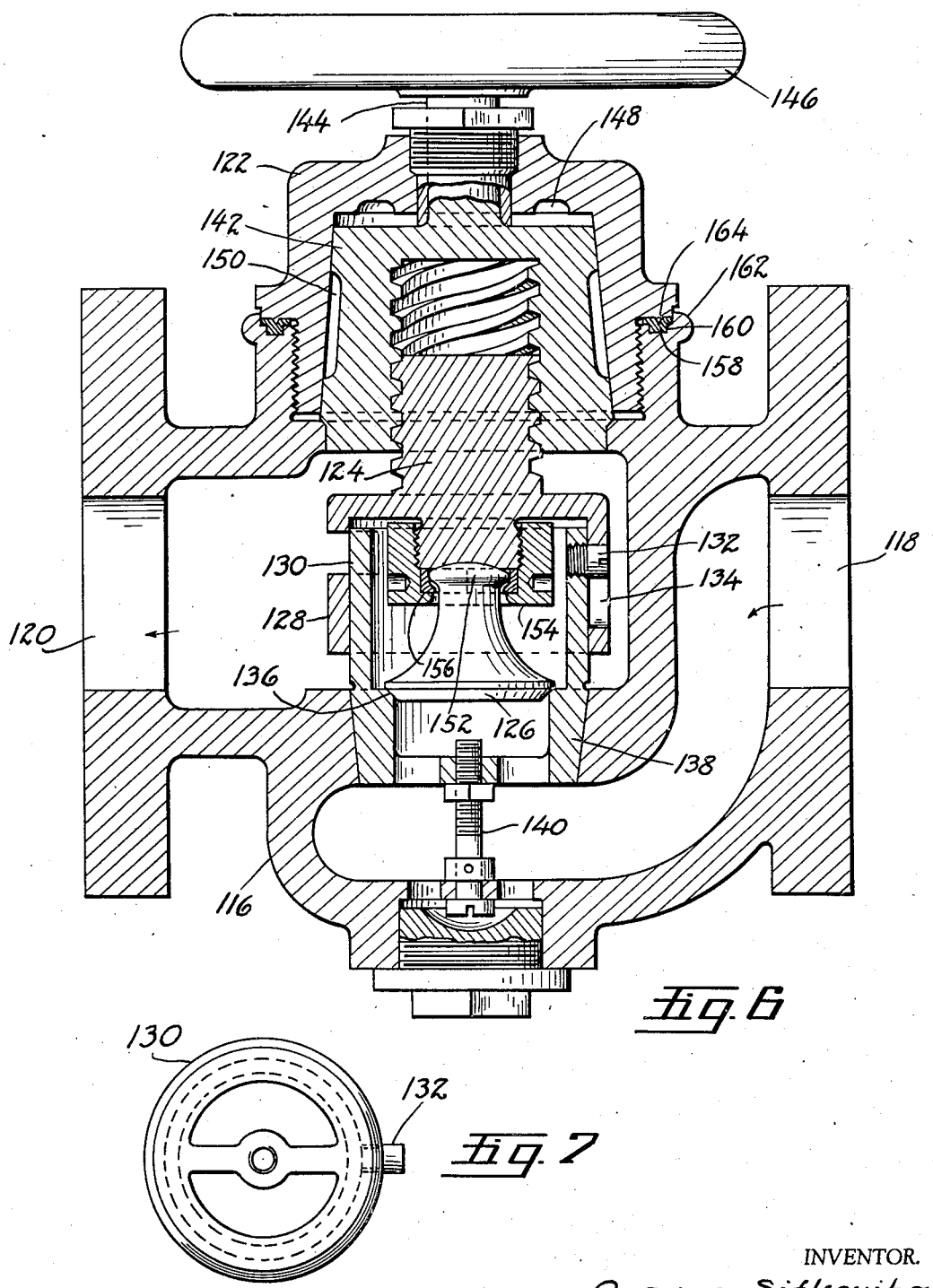

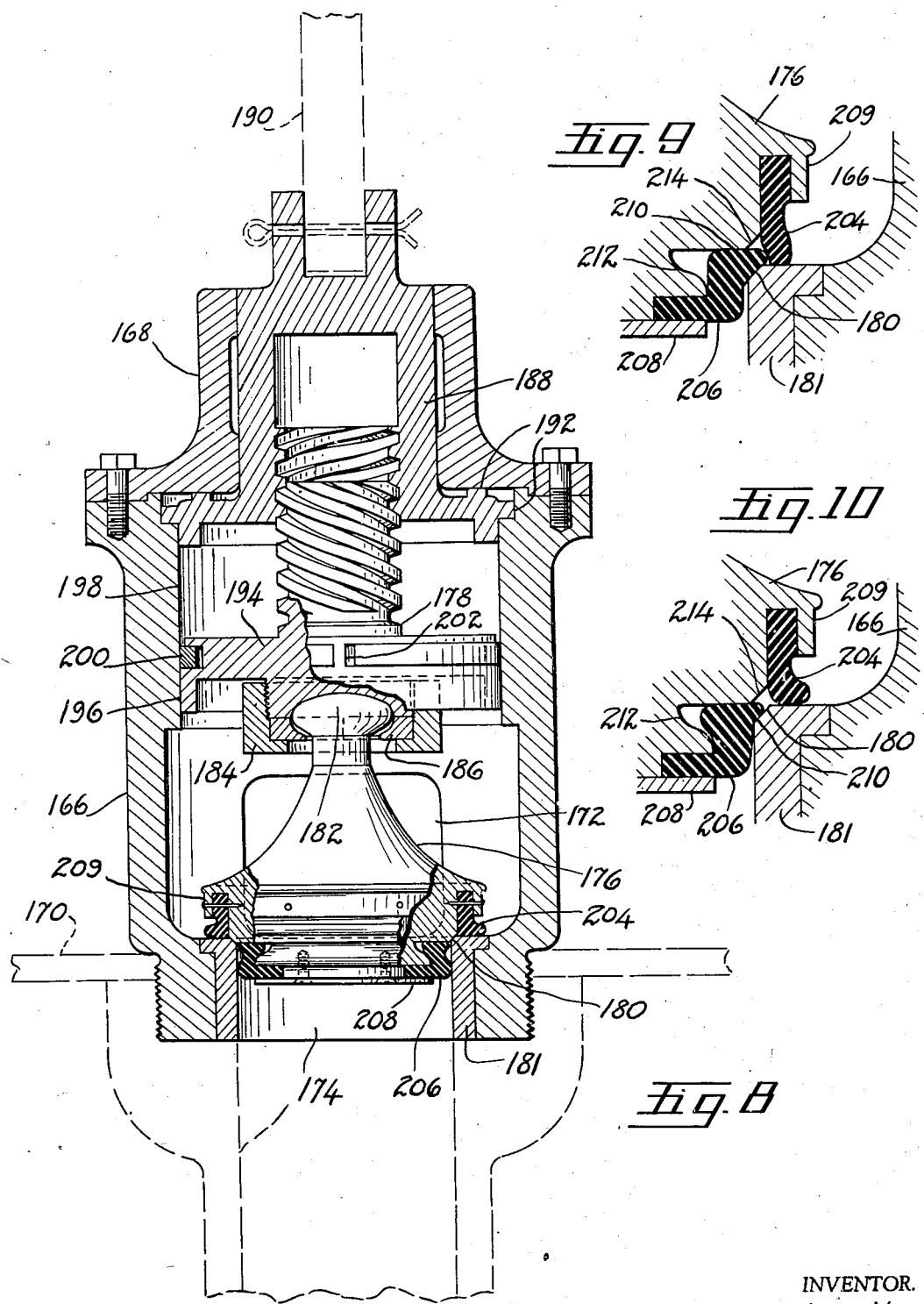

Patented Nov. 7, 1939

2,179,165

UNITED STATES PATENT OFFICE 2,179,165

VALVE

George Sifkovitz, Saegerstown, Pa., assignor to The George Valve Company, Saegerstown, Pa., a corporation of Delaware Application September 13, 1935, Serial No. 40,377

11 Claims. (Cl. 251—47)

This invention relates to valves and more particularly to improvements in the construction and operation of fluid valves.

It is an important object of this invention to provide a packless, quick acting, non-chattering valve for controlling fluids. It is a further object to provide a valve which is easily adjustable for wear and easily dismountable for purpose of repair. The invention contemplates a valve which does not require the use of packing for preventing leakage. The invention, furthermore, provides a novel construction which is adapted to surround the valve seat and equalize the fluid pressure on either side of the valve closing member to prevent the valve from chattering and producing the annoying and damaging throbbing or knocking throughout the fluid system.

Another important object of the invention is to provide a valve which may be continuously and endlessly operated in one direction either tending to open or close the valve and regardless of whether the valve closing member has attained fully closed or open position. That is to say, force may be applied to close or open the valve, and after the valve has attained closed or open position, the operation of the valve may be continued without affecting the position of the valve closure member. This is accomplished by the novel provision of an overload release which frees the valve for further operation after the valve has been closed or fully opened. The overload release functions automatically to free the valve for further apparent operation but actually the valve, though responsive to the operating force, is ineffective in producing further closing or opening movement of the valve head. This feature of the invention renders the valve particularly adaptable for power operation where it is difficult to stop the power application precisely when the valve attains its closed or open position. It is also adaptable for those types of valves upon which considerable force is exerted to operate. If force is applied to the valve after the closing member in the valve has attained closed or open position, the valve continues to operate with the apparent effect of closing or opening the valve, but the automatic release functions to free the closing member from further movement and thereby prevents damage to the parts and increases the life of the valve.

Another important object is to provide a novel construction associated with the valve head and the valve seat which equalizes the pressure of the fluid on both sides of the valve closure member or valve head when the same is in the act of closing or opening the valve. In the past the sudden rush of high pressure fluid on one side of the valve head produced a differential pressure which caused the valve head to chatter and produce loud knocks or throbs throughout the whole fluid system. The chattering action generally takes place when the valve head is in close proximity to the valve seat and either just prior to complete closing of the valve or just after the first opening movement. In overcoming this annoying and damaging action, this invention provides mutual assisting parts which form a closed chamber around the valve seat when engaged by the valve head and arranges that these parts open the chamber directly in proportion to the opening between the valve head and the valve seat. In this manner, substantially equal pressures are built up on both sides of the valve head and the cause of the chattering action is eliminated.

A number of modifications of the invention are described hereinafter showing the applicability of the invention to various types of valves. Essentially, each of these embodiments include, or may include if so desired, an overload release device which allows the operating member of the valve to be actuated even after the valve is fully closed or fully open without effecting the valving action. This is accomplished by providing two rotatable members in the valve which upon relative rotation cause one of the members to advance longitudinally. One of these members is freely rotatable while the other is yieldingly or frictionally held against rotation so as to produce the relative rotation. A valve head is provided on the longitudinally movable member and when the latter advances towards the valve seat, the valve head engages therewith to close the valve. When the member carrying the valve head reaches an extreme position of its movement, either when the valve head is in valve closing position or in fully open position, and further force is applied to operate the valve, the yielding restraint on one of the members gives way and both rotate together but ineffectively to produce lengthwise movement of the valve head either toward or away from the valve seat. The valve head is longitudinally movable only when relative rotation occurs between the members. A meritorious feature of the invention resides in the adjustment for varying the yielding or frictional contact of the restrained member which regulates the time when the overload release will function as well as for adjustment for wear.

Formed around the valve seat and secured to the valve head member are two separate wall formations which are adapted to telescope or overlap with one another to form a housing or shield. This action is arranged to take place when the valve head seats on the valve seat. At this time the wall formations cooperate with one another to form a subsidiary chamber completely enclosing the valve head and the valve seat. When the valve head leaves the seat, the wall formations move relative to one another and open the chamber formed thereby in proportion to the opening action of the valve head. Irrespective of which direction the fluid flows past the valve seat, the character of the housing or subsidiary chamber formed by the cooperation of these walls is such that the pressure of the fluid within the chamber does not greatly differ from that on the other side of the valve head. This is particularly true when the valve head is in close proximity to the valve seat and is either just commencing to close or open the valve. It is at this time when unequal pressures cause the valve to chatter. This formation of the chamber around the valve head and seat acts to equalize the pressure on both sides of the valve. By gradually opening in accordance with the valve head it actually forms a second valve within the body of the main valve.

Various other objects and advantages of my invention will more fully appear from the following specification, appended claims, and accompanying drawings, wherein:

Fig. 1 is a sectional view of one embodiment of the invention,

Fig. 2 is a side elevation of the device shown in Fig. 1 partly broken away to show the interior, Fig. 3 is a sectional view on line 3—3 in Fig. 2, Fig. 4 is a detail view of a valve part, Fig. 5 is a vertical section of another embodiment of the invention, Fig. 6 is a vertical section of another embodiment of the invention, Fig. 7 is a view of a valve part in Fig. 6, Fig. 8 is a vertical section of another embodiment of the invention, Fig. 9 is a detail view showing one position of the valve in Fig. 8, Fig. 10 is another detail view showing another position of the valve in Fig. 8.

In the valve structure shown in Figs. 1 to 4, a main body or casing 10 is provided with a cap 12 at one end and a tubular fitting 14 at the other end. Extending through the tubular fitting into the interior of the valve body, is a pipe section 16 having a knurled member 18 keyed thereto for rotating the pipe. The pipe is provided with a tapered section 20 which cooperates with a like tapered section on the tubular fitting. A pair of lock washers 22 hold the tapering sections in close fitting engagement. A bushing 24 completes the assembly of the pipe to the tubular fitting.

The inner end of the pipe section 16 is shaped for a valve seat 24 upon which the head 26 is adapted to seat and close the valve. The valve head may be made of composite parts as shown in Fig. 1, and the seating portion 28 composed of different metal, such as copper, for example. The valve head is provided with an extension which is threaded into a valve stem member 30. Threaded and locked on the end of the extension is a sleeve 32 which holds the valve stem member 30 in fixed position. The stem member is provided with a cam screw or groove 34 into which extends a tapered pin 36 secured to the inner circumference of an annular member 38 surrounding the valve stem.

The outer surface of the member 38 is recessed to receive a split friction ring 40 which is of a size to frictionally engage with a surrounding wall or drum 42 formed in the cap 12 and protruding into the interior of the valve body. The ends of the split ring 40 are separated from one another by a portion 44 of the annular member 38 bridging the recess as shown in Fig. 4. When force is exerted on the annular member to rotate it, the bridge 44 engages either one or the other end of the split ring and expands the same into tighter frictional contact with the surrounding drum 42. Secured to the inner end of the drum 42 is an annular plate 46 which assists in retaining the annular member 38 in place and prevents the fluid from directly contacting the friction ring. The friction ring 40 and the annular member 38 form an overload release which permits further rotation of the operating parts even after the valve head has seated or has attained its fully retracted position. This will be described in more detail hereinafter.

Surrounding the valve seat 24 and formed integrally with the pipe section 16 is a circular wall formation or shield 48. Similarly, a circular wall formation or shield 50 extends from the valve stem member 30 coaxially with the wall 48 surrounding the valve seat. Wall 50 is of slightly less diameter so that it may interfit or telescope with the larger wall 48. These wall formations and their respective connections with the pipe and the valve stem member form a pair of cup-shaped members facing opposite one another and being of a size to telescope with one another to form a compartment enclosing the valve head 26 and the seat 24. Wall 50 is axially movable with the valve head.

Slots 52 are formed in the wall 50 and these are so arranged that when the valve head is fully retracted they open beyond the rim of the wall 48 and when the valve head is seated they are completely closed by the telescoping action of the wall 48. This is clear upon comparison of Fig. 1 with Fig. 2. A slot and pin connection couples the two wall formations together for rotation in unison but permitting relative axial movement of the two walls. This coupling is best shown in Fig. 2 where a longitudinal slot 54 is provided in the outer wall 48 through which extends a pin 56 secured to the inner wall 50. Slot 54 is likewise adapted to be closed by the interfitting action of the walls when the valve head is seated.

The direction of fluid flow is preferably in the direction indicated by the arrow in Fig. 1. The inlet to the valve is indicated in dotted lines at 58. The direction of fluid flow may be reversed through the valve if desired. The rotary control of the valve by means of the discharge pipe 16 renders this type of a valve peculiarly adaptable for nozzles and for controlling a fluid passing through a hose.

When fluid is passing through the valve and it is desired to cut off the flow of fluid, the knurled member 18 is rotated. This rotates the pipe section 16 including the valve seat 24 and the wall formation 48. The pin and slot coupling transmits the rotary movement from wall 48 to wall 50 and rotates the valve stem. The annular member 38 surrounding the valve stem is urged to rotate but the frictional engagement of the split ring 40 holds this member against rotation. This produces a relative rotation between the valve stem member and the annular member which because of the cam groove causes the valve stem to advance lengthwise towards the valve seat.

When the valve head seats tightly on the valve seat, further lengthwise movement of the valve stem is prevented. If further force is applied to the knurled member 18 to urge the valve further upon the seat, the frictional resistance of the split ring 40 will yield and allow the annular member 38 to rotate. Both the valve stem member and the annular member will rotate together and further lengthwise movement of the valve head ceases. It is therefore seen that the valve may be continuously and endlessly rotated in one direction without affecting the movement of the valve head once the latter has reached one extreme position of its movement.

The same result occurs if the valve is continuously rotated in the opposite direction to retract the valve head. After the valve stem member strikes the cap 12, further lengthwise movement is prevented and the friction ring must yield if overpowering force is applied. In actual operation of the valve, it is relatively easy to rotate the valve when the valve stem has not reached the two extreme positions of its movement, but relatively large forces are required to rotate the valve parts when the valve head is prevented from further longitudinal movement and the friction ring must be rotated.

The two telescoping wall sections form a housing which equalizes the fluid pressure around the valve head and prevents valve chatter. When the valve head is seated, the outlet slots 52 are closed by the surrounding wall section 48. Upon opening the valve, the slots gradually open in conformity therewith. The fluid existing in the valve body immediately begins to pass into the housing. At the initial movement of the valve head, the outlets are only slightly open and only a small amount of fluid passes into the housing. This reduces the pressure of the fluid acting on the valve head to such an extent that the pressure on both sides of the valve head can be considered as equalized. This arrangement removes the possibility of valve vibration or chatter which is caused by sudden unequal pressures acting on the valve head.

If the fluid flow is in a direction reverse to that shown in Fig. 1, the wall formation will similarly act to equalize the pressure on opposite sides of the valve head. When the valve head first commences to leave the valve seat, the pressure acting on the end of the head will cause a small amount of fluid to escape past the valve seat into the equalizing chamber. Since these walls of the chamber have opened slightly at the outlet ports 52, the major portion of this fluid is captured and confined in the chamber and against the opposite side of the valve head. The fluid within the chamber is at a pressure substantially equal to that acting on the end of the valve head, and the tendency to valve chatter is thereby eliminated. Further opening of the valve head likewise increases the opening of the outlet ports 52 so that the pressure acting on either side of the valve head is gradually reduced.

The sliding contact between the cup-shaped walls 48 and 50 need not be fluid tight. It is sufficient that they function to capture a large portion of the fluid passing the valve seat in one direction of flow as described in the previous paragraph or to prevent an immediate application of the high pressure in the body of the valve when the direction of flow is the reverse. The sliding action of the walls relative to one another avoids corrosion.

The invention in Fig. 5 is applied to a globe valve adapted preferably for controlling steam. It comprises a main valve body 60 to which is threaded a cap 62. Extending through the cap is a control member 64. This control member is integrally formed with a member 66 which conforms in size to the inner surfaces of the cap and is provided with a central cavity through which extends a valve stem member 68. A bearing surface or guide 70 is provided around member 66 to permit free rotation of the same. The valve stem member is provided with a cam groove 72 into which extends a pin 74 threaded radially in member 66. As in the first described embodiment, rotation of the cam groove relative to the pin causes lengthwise movement of a valve head 75 threaded in the valve stem member.

The valve seat 76 is formed in the interior of a generally cylindrically shaped member or sleeve 78 which is provided with a wall section or shield 80 surrounding the valve seat. This wall section overlaps a cooperating wall section 82 formed integrally on the valve stem. These wall sections cooperate with one another, as described in the previous embodiment of this invention, to form a subsidiary chamber completely confining the valve head and the valve seat when the two are in valve closing position. Outlet ports 84 formed in the wall section 82 are arranged to open when the valve head is retracted as shown in the figure and to be closed by the telescoping action of the wall 80 when the valve head approaches and engages the valve seat. These wall sections are connected together by a slot and pin coupling indicated at 86 and 88 respectively. This coupling rotatively couples the wall sections together but permits axial movement of one wall section relative to the other.

Sleeve 78 is provided with a tapered extremity 90 fitting into a conical bore or hole in the valve body. This tapered extremity is drawn into close fitting engagement with the conical wall of the hole by means of an adjustable screw member 92. This adjustable member bridges the passage 94 and is connected at one end to a spider formation 96 and at the other end to a like spider formation 98. The spiders are formed integrally in the sleeve 78 and the wall of the valve body respectively. The spider formation permits the flow of fluid from the passage into the interior of the sleeve 78 and from the passage into a conduit 100 which is closed by a plug 102. The screw 92 is rotatably journalled in the spider 98 and a collar 104 keyed thereon prevents axial movement while permitting rotative movement for purpose of adjustment. The other end of the screw is threaded in the spider 96 and a lock nut 106 fixedly secures the screw in adjusted position.

The inlet to the valve is indicated at 108 and the outlet at 110; the preferred direction of fluid flow being clearly indicated by arrows. When the valve is opened, the pressure of the fluid first strikes the vertical wall 112 of the valve body and is reduced thereby. Sediment and foreign matter in the fluid gravitates easily towards the bottom of the flow in the reduced speed of the current and finally enters the chamber 114 formed by the concave end of the plug 102. In place of a plug, a pipe or other suitable conduit may be employed. The area below the spider 98 acts as a collector for sediment, scale and other foreign matter.

To operate this valve, the control member 64 is rotated by a suitable wrench or other instrument. If it is desired to close the valve, the control 64 and its associated member 66 are rotated from right to left. This causes the pin 74 to travel in the cam groove and force the valve stem and head vertically downward. The valve stem is prevented from rotation by the close frictional contact of the tapered section 90 against the conical wall of the hole. This restraint is transmitted to the valve stem through the pin 88 and slot 66 which couples the two sleeves 80 and 82 together. When the valve tightly engages the valve seat with a pressure exceeding the frictional engagement of the tapered section 90 and excessive torque is applied to the control 64, the frictional engagement of the taper 90 will yield and permit both the sleeve 78 and the valve stem 68 to rotate. This will discontinue the relative rotation between the valve stem and the member 66 which will immediately stop further advance of the valve head. It is therefore seen that an overload release is provided for this type of valve. The overload release similarly functions when the valve head is retracted to its fullest extent.

The telescoping wall sections 80 and 82 function similarly as that described in the previous embodiment. When the valve is closed, they form a closed compartment about the valve seat. When the valve head is retracted, outlets 84 open in proportion thereto. The steam or other fluid escaping past the valve seat is confined in the compartment so as to equalize the pressure on both sides of the valve head. Only a portion of the steam so confined is allowed to pass through the outlets 84 and this in proportion to the opening of the valve head.

The frictional engagement of tapered section 90 is likely to decrease because of wear, or it may be desired to regulate the time when the overload release commences to operate. In either case the plug 102 is removed and the screw 92 is accessible for adjustment. When the screw has been turned to the desired amount, the lock nut 106 is tightened by a suitable tool adapted to extend through the spider 98. This prevents the possibility of relative rotation between the screw and the sleeve 78 which might throw the valve out of satisfactory adjustment.

The embodiment of the invention in Figs. 6 and 7 is likewise a globe type valve adaptable however for cold fluids. There are a number of features in common between this valve and the previously described embodiment, and these will be briefly described.

The valve body is of the same construction as that shown in the previously described valve. It consists of a valve body 116 having an inlet 118 and a discharge port 120. A cap 122 is threaded to the body. The valve is provided with a valve stem member 124 carrying a rotatable and floatable head 126 as will be described in more detail hereinafter. A pair of telescoping wall sections 128 and 130 are coupled together for joint rotation by the pin 132 and slot 134 coupling. This coupling permits axial movement of one wall relative to the other. A valve seat 136 is formed on an inner extending shoulder within the wall section 130.

Wall section 130 is formed integrally with a tapered section 138 which as in the previously described embodiment of the invention frictionally contacts the tapered wall of a bore or hole in the valve body. The frictional contact may be regulated by a screw 140. Reference is made to the previously described valve for a description of this operation.

The interior of the cap 122 is tapered and within this tapered bore is mounted a correspondingly tapered member 142 having a shank 144 to which a handle 146 is keyed. An annular groove 148 in the cap forms a pocket for receiving a grease packing such as graphite grease or oil. A circular groove 150 around the member 142 similarly forms a pocket for grease packings. Member 142 is provided with a centrally threaded cavity into which extends the valve stem screw 124. Surrounding the shank 144 is an adjustable screw bushing which bears on the laterally extending portion of the member 142.

The valve head 126 is rotatably and floatably attached to the end of the valve stem member 124, the closure thrust being received by the partial ball and socket construction 152. The retaining collar 154, whose smallest bore is sufficiently large to permit the ball end of the head to pass therethrough, is screwed onto the threaded extremity of the valve stem. The split washer 156 is interposed between the retaining collar 154 and the ball end of the valve head. The washer is provided with an arcuate seat engageable with the underside of the ball end of the valve head. The underside of the ball end is spherical in form, its radius of curvature being substantially the same as the upper side of the ball end. This swivel joint allows the valve head to rotate freely and at the same time permits it to have a slight angular movement for self adjustment as it engages the valve seat.

Between the cap 122 and the valve body 116 there is interposed a body of soft metal 158, such as lead. This metal is received in a circular groove 160 formed in the shoulder 162 of the valve body. An annular rib or nub 164 is formed on the cap which bites into the soft metal as the cap is screwed tightly into place. This forms an added seal preventing the escape of fluid. Furthermore, this seal is self adjustable when other parts of the valve are adjusted for wear. When the tapered bearing surface between the cap and the member 142 wears, the cap may be drawn into tighter engagement with the member by tightening the cap on the valve body. The yield of the soft metal will permit this adjustment without affecting its sealing action.

The operation of this valve is similar to the valve described previously. Instead of a cam groove and pin, the threaded connection between the valve stem member and the surrounding member acts to cause lengthwise movement of the valve head when relative rotation takes place between these members. When the valve head commences to engage the seat, the swivel joint connection allows the valve head to adjust itself for any irregularities in its motion. It sometimes occurs that the parts of a valve of this type become misaligned and the valve head is directed towards the valve seat at an angle to its correct line of movement. In that event, the swivel joint allows the valve head to adjust itself as it engages the inclined face of the valve seat.

In the embodiment of the invention illustrated in Figs. 8, 9 and 10, an outlet valve is shown which is specially adapted for controlling the discharge of fluid from tanks, such as oil tank cars. The valve comprises a valve body 166 having a cap 168 secured thereto. The valve body is mounted upon the floor 170 of a tank or similar fluid supply. The inlet 172 is on a level with the floor. A tubular outlet 174 is shown in dotted lines connected to the base of the valve body.

The valve operating parts comprise a valve head 176 swiveled as in the previously described valve to the end of a valve stem member 178. The valve head is adapted to engage a valve seat 180 and cut off the discharge of fluid through the outlet. The valve seat is formed on a bronze bushing 181 which fits the bore of the outlet. The swivel joint is similar in construction to that employed in the previous described valve and comprises a ball end 182 on the valve head engageable in a concave seat on the base of the valve stem. A collar or nut 184 is threaded to the valve stem and supports a split washer 186 which completes the assembly of the swivel joint. The valve head is free for rotation and slight angular movement.

The valve stem 178 is thrust lengthwise of the valve body by the relative rotation of the partially surrounding member 188 which extends through the cap and is adapted to be operated by a crank arm 190. Member 188 is provided with finished surfaces 192 which bear against the valve body and cap and improve the rotating movement of the member.

The valve stem 178 is provided with means for frictionally restraining it from rotation. This means comprises a shoulder 194 having a turned down edge 196 slidably contacting with a guideway 198 formed by the wall of the valve body. The shoulder is channeled to receive a split friction ring 200 which frictionally engages the wall of the valve body and is adapted to be expanded into tighter engagement therewith by the action of the transverse channel wall 202 upon the ends of the piston ring.

The valve is provided with means which automatically functions upon the operation of the valve to wipe the seat and form a protecting envelope therearound. This means comprises a pair of flexible elements or wipers 204 and 206 of approximately the same diameter as the valve seat secured to the valve head. These elements may be composed of rubber if so desired. Flexible element 204 is secured by pins between an overhanging portion 209 of the valve head and the main portion thereof. Flexible element 206 is secured to the base of the valve head by a retaining member or washer 208. This valve seat wiping and protecting means is described and claimed in my divisional copending application, Serial No. 100,487, filed Sept. 12, 1936.

As clearly shown in the detail Figures 9 and 10, the flexible element 204 is cut away just below the termination of the overhanging retaining wall 209 of the valve head. This assists the element in flexing outwardly as indicated in Fig. 10. The flexible element or wiper 206 has a radial flange 210 overlying the valve seat. The valve head is cut away inwardly of the wiper at 212 so as to permit the wiper to retract inwardly away from the valve seat as indicated in Fig. 10.

Figures 9 and 10 illustrate the purpose and operation of the flexible elements. In Fig. 9 the flexible elements have just contacted the valve seat on the downward motion of the valve stem. Attention is directed to the cooperation between these elements which contact one another and form a housing completely enclosing the inclined face 214 of the valve head. This face is completely sheltered by these elements at all times except when the valve head is in close proximity to the valve seat.

In Fig. 10 the valve head has advanced approximately half as close to the valve seat as in Fig. 9. The flexible elements are being flexed and compressed by the pressure of the valve seat and its surrounding surfaces. The face 214 is gradually being exposed by the elements. The overlying flange 210 is pinched between the valve seat and the advancing head and slides over the valve seat wiping it clean. The other element 204 flexes outwardly away from the valve and urges all foreign matter, such as scale, away from the valve seat and keeps this matter away during the sealing action of the valve head. The position of the flexible elements at complete closing of the valve is shown in Fig. 8.

This valve is particularly adaptable for the oil and gasoline tanks on railway cars. The arrangement of the flexible elements is especially important in keeping the valve closing parts in clean and workable condition. Oil tank cars are closed for the greater portion of the time and scale and other foreign matter are very likely to corrode the faces of the valve seat and head and possibly to freeze the valve in closed position. The flexible elements function both to clean the valve seating parts and to protect the same from contamination.

The swivel coupling is likewise important for outlet valves of this type. Many of the discharge outlets of tanks must be operated from the top of the tank as, for example, in the case of railroad tank cars. A long crank arm must be employed in the majority of the tanks to reach the outlet valve in the floor of the tank. These crank arms are likely to bend or flex under the large turning forces applied thereto and this subjects the valves to unintended strains which, if a swivel joint of this type were not employed, would direct the valve head at an angle against the valve seat and prevent proper closure. The swivel joint allows the valve head to adjust itself and compensate for irregular valve operation.

The frictional release is also important in these types of valves. Large turning forces are applied to operate these valves, and if care is not taken the valve will be operated with ruinous effect. By providing means for allowing the valve stem member to slip when overpowering forces are applied, further advancement of the valve head is discontinued and damage to the parts is prevented. The operator can tell by the additional resistance encountered that he is turning the split friction ring and ineffectively operating the valve. The swivel joint permits the valve head to remain stationary against the valve seat while the valve stem and other parts are rotated. This prevents injury to the valve seat and the surrounding flexible elements.

The various features shown in the four embodiments of this invention are interchangeable. It is obvious that the manner of coupling the rotating members may be revised in various ways and that the manner of yieldingly restraining one of these members from rotation may be varied. In the first described embodiment, both the valve seat and the valve stem are rotated together while a third member is restrained from rotation to impart longitudinal movement to the valve stem. In the second described embodiment (Fig. 5), both the valve seat and valve stem are restrained from rotation while the third member is rotatable. The third described embodiment is similar to the second in this respect. In the fourth embodiment, the valve seat is permanently stationary, the valve stem is yieldingly restrained from rotation, and the third or operating member is free to rotate.

The construction of the telescoping sleeves or wall sections may be varied as indicated by comparing the first three described embodiments of the invention. It is not necessary to employ these sleeves for the outlet valve described in Figures 8 to 10. The pressure of the fluid in this particular case is relatively low. The flexible elements or wipers may be employed on other types of valves as well if desired. Likewise, the swivel joint is not limited to the valve structures upon which it is shown herein.

Various modifications will be apparent to those skilled in the art, and for that reason I intend to limit myself only within the scope of the appended claims.

I claim:

1. A valve comprising, in combination, a rotatable member, a member frictionally retained against rotation but yieldable to relative strong forces to rotate with said first member, said members operatively coupled together to produce lengthwise movement of one member when relative rotation takes place between said members, an annular valve seat having an inclined face, a valve head having an inclined face adapted to engage the inclined face of the valve seat to cut off the flow of fluid through the valve, and a swivel joint coupling said valve head to said lengthwise movable member and arranged to allow slight angular play of the valve head for self adjustment as the valve head seats on the valve seat, said swivel joint permitting said valve head to bear upon said valve seat without rotation relative thereto although rotation is imparted to said lengthwise movable member.

2. A valve comprising, in combination, a casing, a valve seat therein, a rotatable valve stem member in said casing having a valve head engageable with said valve seat, a second rotatable member in said casing, a spiral drive coupling said members together and operable upon relative rotation of the members to bodily move said valve stem member longitudinally and seat said valve head upon said valve seat with a force sufficient to cut off the flow of fluid thereby, said casing having an internal wall surface extending around the axis of rotation of said members, one of said rotatable members having a circular part frictionally engaging said wall surface of the casing and yieldingly restraining the member from rotation, means for rotating the other of said members, said frictional contact between said restrained member and said wall surface of the casing preventing rotation of the former while the other member is rotated until said valve head is seated upon said valve seat with a force greater than the force which is necessary to rotate said restrained member at which time both members will rotate and further longitudinal advance of said valve stem member is ended.

3. A valve comprising, in combination, a casing, a valve seat in said casing, a rotatable valve stem member in said casing having a valve head retractibly engageable with said valve seat, a second rotatable member in said casing, a spiral drive coupling said rotatable members together and operable upon relative rotation of said members to cause the valve stem member to move longitudinally in the casing and seat said valve head upon said valve seat, means for rotating one of said members, means carried by the other of said members yieldingly expandible into frictional engagement with a stationary part of the casing and adapted to restrain the member upon which it is carried from rotation in order to produce relative rotation of the members and consequent longitudinal movement of one of these members, said expandible means adapted to yield to relatively strong rotative forces imposed thereon after said valve head engages said valve seat with a force greater than the force of frictional engagement of said expandible means with said stationary part of the casing whereby said restrained member is permitted to rotate with the other member and longitudinal movement of one of the members is precluded.

4. A valve comprising, in combination, a casing, a valve seat therein, a rotatable valve stem member in said casing having a valve head engageable with said valve seat, a second rotatable member in said casing, a spiral drive coupling said members together and operable upon relative rotation of said members to bodily move said valve stem member longitudinally in said casing to seat said valve head upon said valve seat with a force sufficient to cut off the flow of fluid thereby, said casing having an internal circular wall section extending around the axis of rotation of said members, a circular element having its outer peripheral surface frictionally contacting said internal wall section, means connecting said element with one of said members for restraining the same from rotation, means for rotating the other of said members, the retarding action of said circular element upon one of said members causing relative rotation of said members and consequent longitudinal movement of said valve stem member until said valve head seats upon said valve seat with a force greater than the force of frictional engagement of said element with said wall section at which time said restrained member is permitted to rotate in unison with said other member, thereby discontinuing any further longitudinal movement of the valve stem member toward the valve seat.

5. A valve structure including, in combination with a valve body having a valve seat and a valve head engageable therewith, a pair of elements telescopingly interfitting with one another to form a chamber in the valve body completely enclosing the valve head and the valve seat when the two are in engagement, one of said elements operatively connected with said valve head and movable therewith to open said formed chamber as the valve head leaves the valve seat and in proportion to its movement therefrom, one of said elements provided with a substantially longitudinal slot, means on said other element extending into said slot preventing relative rotation of said elements but permitting telescoping movement of the elements.

6. In a valve device, a rotatable member carrying a valve head, a second rotatable member, means coupling said members together and operable upon relative rotation of said members with respect to one another to move said valve headed member longitudinal in the valve device, a tubular element having an internal annular shoulder intermediate its ends shaped to form a valve seat, said valve head adapted upon longitudinal movement in one direction to advance through said tubular element and seat upon said valve seat, a tubular element carried by said valve headed member and being of a size to telescope with said first mentioned tubular element and to form a housing completely enclosing said valve head and said valve seat when the two are in valve closing position, means coupling the said tubular elements together preventing relative rotating movement but permitting telescoping movement, and means on said first mentioned tubular element frictionally engaging a part of said casing to retard its rotative movement and acting through said means connecting said tubular elements together to retard rotation of said valve headed member, and means for rotating the other of said two members and by reason of the retarding action on the valve headed member causing longitudinal movement of the latter.

7. A valve structure comprising, in combination, a valve casing providing an interior valve chamber, a valve seat member within said chamber, a valve head member within said chamber, a third member within said chamber, means for rotatably supporting said third member and at least one of the other two members in the valve chamber, means operatively coupling said third member with one of the rotatable members and operable upon relative rotation between said members to cause the member with which said third member is coupled to move longitudinally into and out of engagement with the remaining member, means yieldingly resisting rotation of one of said operatively coupled members so as to cause relative rotation between the coupled members and consequent longitudinal movement of the unresisted rotatable member when rotative force is applied to the latter, said yieldingly resisting means permitting resisted rotation of the member with which it is associated thus causing joint rotation of the coupled members and thereby halting further advance of said longitudinally movable member when the valve head member and valve seat member engage with a force greater than the resistance to rotation imposed by said yielding means whereby the device may be endlessly operated in valve closing direction without engaging the valve closing members with any greater force.

8. A valve structure comprising, in combination, a valve seat, a valve head, valve operating means for moving said valve head into or out of engagement with said valve seat, a pair of similarly shaped cooperating wall elements coaxially arranged and being of a size to closely telescope with one another, one of said wall elements surrounding said valve seat, the other wall element secured to said valve head and movable therewith, said elements adapted upon movement of said valve head toward said valve seat to telescope and form a compartment inclosing the valve head and valve seat, said wall elements shaped to gradually open or close said compartment to the exterior as said valve head and valve seat are moved relatively away or toward one another and thereby equalize the fluid pressures acting upon the valve head, means coupling said telescoping elements together for joint rotation but permitting said telescoping action, said elements also forming a part of the valve operating means and adapted when said valve head is moved to rotate together in one or the other direction as the two elements telescope inwardly or outwardly relative to one another.

9. In a valve structure, a valve seat and a valve head engageable with said valve seat, circular wall elements rotatably mounted and telescopingly interfitting with one another, said elements operatively associated with said valve head and valve seat and adapted to telescope together and form a closed compartment around the valve seat and valve head when the latter are engaged and to open away from one another when the valve head disengages from the valve seat, said telescoping elements also forming a part of the valve operating mechanism and adapted to rotate when the valve head is moved toward or away from the valve seat.

10. A valve device comprising, in combination, a rotatable valve head member, a rotatable member having a valve seat with which said head member is engageable to close the valve, means coupling said members together for joint rotation, a rotatable operating member, means operatively coupling said last member to one of said first two members and adapted upon relative rotation to cause bodily movement to the latter toward or away from valve closing position, and means yieldingly resisting rotation of one of said first two members to thereby cause relative rotation of said operatively coupled members.

11. A valve structure comprising, in combination, a rotatable member carrying a valve head, a second rotatable member having a valve seat upon which said head is adapted to advance and seat to close the valve, a rotatable valve operating member, means operatingly coupling said rotatable valve operating member to one of said other members and adapted to impart longitudinal movement to the latter when relative rotation occurs between said coupled members, means yieldingly resisting rotation of the other coupled member but adapted when said valve head engages said valve seat in valve closing position to yield and permit joint rotation of said members and the valve head with said valve seat thereby preserving the seat from wear.

GEORGE SIFKOVITZ